United States Patent Office 3,843,501
Patented Oct. 22, 1974

3,843,501
METHOD OF FORMING EXTRUDER SCREW
Kenneth Bryan King, Hitchin, England, assignor to Imperial Chemical Industries Limited, London, England
No Drawing. Filed July 14, 1972, Ser. No. 271,742
Int. Cl. B23p 1/00
U.S. Cl. 204—129.65    10 Claims

ABSTRACT OF THE DISCLOSURE

Method of forming an extruder screw by applying to the surface of a metallic rod of substantially circular cross-section a masking resist in a configuration corresponding to that of the land pattern of the screw, and subjecting the masked rod, as anode, to the action of an electrolytic solution traversed by an electric current.

---

This invention relates to screw extruders suitable for the continuous extrusion of thermoplastic polymeric materials, and, in particular, to a method of forming screws for use in such extruders.

A screw extruder is, in effect, a pulse-free pump designed to deliver a thermally homogeneous melt at a uniformly high rate, and is widely employed in the plastics industry in the production of films, monofilaments, cables, tubes, rods and coatings of thermoplastic polymeric materials. Essentially, a screw extruder comprises a rotatable screw located in a closely-fitting, heated cylindrical barrel to which polymeric material, usually in granular form, is fed from a hopper. Rotation of the screw forces the polymeric material along the barrel where the granules melt and coalesce under the influence of thermal energy transferred from the heated barrel and supplemented by frictional heat generated by movement of the screw, the resultant plasticised melt being ejected through a suitable die orifice.

Of prime importance to the efficient performance of the extruder is the screw, which must be able to withstand the very high torsional and compressive loads imposed upon it, which must be resistant to comparatively high temperatures and often to corrosive by-products, and which must be manufactured to within close dimensional tolerances to ensure adequate and uniform extrusion behaviour.

Hitherto, screws have been manufactured by essentially mechanical techniques, a typical sequence of operations being, selection of a forging of appropriate size and grade of steel, testing of the forging to ensure freedom from structural defects, forming an appropriate pattern of screw flights on the forging by a preliminary rough milling operation, machining the screw on a lathe, surface hardening the machined screw by a suitable heat treatment, and finally grinding and polishing the screw to provide an appropriate surface finish. Manufacture of a screw is, therefore, extremely costly and involves a lengthy sequence of operations requiring the exercise of considerable skill at every stage in the procedure. In addition, the screw must be adequately supported during the mechanical operations to ensure that the linearity of the finished screw is within the permissible tolerances.

We have now developed a relatively simple and rapid method which facilitates the production of screws.

Accordingly, the present invention provides a method of forming an extruder screw which comprises applying to the surface of a metallic rod of substantially circular cross-section a masking resist in a configuration corresponding to that of the land pattern of the screw, and subjecting the masked rod, as anode, to the action of an electrolytic solution traversed by an electric current.

The present invention also provides an extruder screw whenever produced by the aforementioned method.

Any steel conventionally employed in the production of extruder screws is suitable for use in the method of the present invention. Thus, mild steel, low alloy steel, or carbon steel may be employed. However, the method of the present invention is particularly suitable for the production of screws from alloys which are particularly hard and cannot readily be machined—for example, iron-, cobalt-, or nickel-based alloys having a Vickers Hardness, measured in accordance with British Standard No. 427 of 1961, of at least 450. For screws employed in the extrusion of glass-filled polyamides we have found that "Stellite," a cobalt-chromium base alloy, is particularly suitable. We prefer not to employ the so-called "easy-machining" steels which usually have a relatively high content of sulphur, at least some of which is liberated as hydrogen sulphide when subjected to the method of the present invention.

In forming screws according to this invention, the electric current is transmitted through the electrolytic solution to the anode from a cathode which should exhibit good electrical conductivity, and be resistant to chemical erosion by the electrolytic solution. Cathodes fabricated from stainless steel have been found to be particularly suitable.

Masking of the land pattern of the screw is effected—for example, by winding a masking tape in a spiral pattern over the surface of the metallic rod. Alternatively, and more conveniently, paint, wax, or similar barrier material, is applied in the appropriate pattern by stencil, brush, dip, spray, or screen-printing techniques. If desired a photo-resist coating may be applied to the rod and exposed to radiation through a suitable photographic master negative to harden appropriate areas of the coating. As a further alternative, the entire surface of the rod may be coated with a masking material from which selected areas are subsequently removed, as—for example, by machining, to expose the desired pattern.

To ensure freedom from surface defects on the lands of the screw, it is desirable that the surface of the metallic rod be thoroughly cleaned to remove all traces of oil and grease or other contaminants, prior to application of the masking resist. This cleaning is conveniently effected by immersion of the rod in a suitable solvent, and the surface of the rod may, if desired, be subsequently abraded to provide a fresh surface to which the masking resist can be keyed. Several layers of the masking resist may be applied to the rod in succession to minimize the incidence of pinholes or other flaws in the resist.

Acid or salt electrolytic solutions are suitable for use in the etching process of the present invention. For example, solutions of salts of the alkali metals such as the halides, nitrites and nitrates of sodium or potassium may be used. We have found that an aqueous solution of sodium chloride together with sufficient hydrochloric acid to avoid significant precipitation of metal dissolved from the anode is eminently satisfactory for etching many alloys. In general, an amount of sodium chloride of from 1 to 10%, preferably 5% by weight of the solution is employed. Although larger quantities of hydrochloric acid may be employed, we prefer, in order to reduce excessive fuming of the solution, that the amount of hydrochloric acid should not exceed 10%, and should preferably be from 2% to 4% by weight of the solution.

Contacting of the electrolyte with the anode is conveniently achieved by suspending the anode in a bath of electrolytic solution, so that at least the parts of the anode to be etched are immersed in the solution. The anode may be suspended from a simple support member so as to project vertically downwards into the solution, thereby eliminating the need for a complex supporting system of the type required to prevent linear distortion of the screw when a mechanical machining operation is employed. Alternatively, the anode may be suspended or supported in a tubular container through which electrolytic solution is pumped, this arrangement being particularly convenient when it is desired to incorporate a filtration unit in the system to remove powdered metal and other debris liberated during the electrochemical reaction.

In the etching operation of the present invention electrical energy may be supplied as alternating current, but for efficient operation is preferably supplied as low voltage direct current at—for example, from 5 to 20 volts. The amperage rating of the current is suitably in the range from about 10 to 30,000 amperes, or greater, the higher current ratings reducing the etching times involved in screw production, and being suitable for etching rods of large surface area.

Although electrical storage batteries may be employed as a source of electrical energy, we prefer that a suitably rectified main supply should be used. Alternatively a rotary generator may be used, and we have found that an arc-welding generator capable of supplying direct current at an amperage rating such that the current density at the anode is in a range of from about 0.5 to 5 amperes per square centimetre is particularly suitable.

The method of the present invention is applicable to the production of full flighted screws, i.e. screws having turns or flights over their entire length. These turns may be made with a constant pitch, usually equal to the screw diameter, but, simply by varying the masking pattern applied to the unetched metallic rod, screws having a variable pitch along the length of the screw are readily fabricated by our invention. Screws having interrupted flights are also readily produced by our electrochemical etching technique. Thus, a screw may be provided with a fluted mixing section intermediate the ends of the screw, by applying a pattern of axially disposed masking strips to an appropriate zone of the unetched rod, or a zone of the rod may be masked over the entire circumferential surface to provide a compression zone in the finished screw.

The root diameter at zones along the length of the screw may be controlled by varying the time for which the respective zones are subjected to the action of the electric current in the electrolytic solution. Thus, screws having a root diameter varying along the length of the screw may be produced by progressively withdrawing the anode from the electrolytic solution in which it is immersed. For example, a tapered root diameter is obtained by withdrawing the anode at a substantially constant rate, whereas a sharp increase in root diameter, as for example, in a screw of the type required for the extrusion of polyamides, is obtained by rapidly withdrawing from the electrolytic solution the zone of the screw which has attained the root diameter desired for the compression zone of the screw, while the remaining length of the screw is allowed to remain in contact with the solution until the root diameter desired for the feeding section of the screw is attained. Alternatively, a screw of the latter type is obtained by first etching only that zone of the screw for which a small root diameter is required, and subsequently etching the whole flight zone of the screw, thereby to produce a screw having a smooth profile. Other screw profiles are, of course, readily obtained by appropriate variation of the masking pattern, and/or withdrawal procedure.

Control of the root diameter of the screw may also be achieved by varying the current density at zones along the length of the anode, for example, by providing an insulated sleeve or sleeves around a specified zone or zones of the cathode, and appropriately varying the position of the sleeve or sleeves in the course of the etching operation, thereby appropriately affecting the current density at the anode.

At the drive end of the screw, a key-way system or a splined shank for engagement with the extruder drive mechanism is readily incorporated in the course of our etching technique by appropriately masking the end portion of the rod prior to etching.

Although in forming an extruder screw from steel by the method of our invention it might be expected that a certain degree of undercutting or erosion of metal from the regions immediately below the protective masking would be experienced, we have observed, rather surprisingly, that the edge profile of the resultant screw flights is practically "square," i.e. elements of the opposed faces of the screw flights lie in planes substantially normal to the longitudinal axis of the screw, and may even exhibit a suitable root radius i.e. a slightly concave curvature at the junction of a flight and the root of the screw. In practice, the width of the initial masking should be slightly greater than that of the desired land width in the finished screw.

Electrochemical machining techniques have hitherto employed appropriately shaped cathodes, the approximate shape of the cathode being imposed on the anode during the etching operation. The use of a specially shaped cathode is not required in the method of this invention, and rod cathodes of circular, square, polygonal, or other cross-section are perfectly satisfactory. Multiple cathodes may, of course, be employed to obtain a uniform current distribution in the electrolytic etching solution. Likewise, a tubular cathode within which the anode is disposed during the reaction may be employed. Uniform etching may also, if desired, be facilitated by rotating the anode in the electrolytic solution.

On completion of the etching operation, the masking resist is removed from the lands of the extruder flights by any suitable method—for example, by melting, machining, or by treatment with an appropriate solvent.

Extruder screws produced according to our invention may be subjected to conventional grinding and polishing techniques to improve or alter the surface finish of the screw, if desired, although this is not always necessary.

Our invention provides a method of forming extruder screws much more rapidly than conventional mechanical machining techniques, enables a wide range of screw profiles to be easily produced, eliminates the need for rigidly supporting the screw blank during the forming operation, and enables extremely hard materials to be employed, thereby eliminating the need for surface hardening heat treatments with the attendant risk of thermal deformation of the finished screw.

The invention is illustrated by the following Examples.

EXAMPLE 1

A 3% chrome steel alloy rod 355 mm. long and 19.05 mm. in diameter was wound with a polyvinyl chloride masking tape so as to expose a spiral pattern on the surface of the rod corresponding to a screw flight having a land width of about 3.17 mm. On to the surface of the wound rod was then brushed an electrically insulating chlorinated rubber paint, and the masking tape was carefully unwound, before the paint had dried, to leave an unbroken deposit of paint corresponding to the land pattern of the screw.

The painted rod (after the paint pattern had dried) was employed as anode, together with an 18/8 stainless steel rod cathode of similar dimensions, in an electrolyte bath comprising an aqueous solution of sodium chloride (7% weight/volume) containing 2% by volume of hydrochloric acid, and a current of 80 amperes at 10 volts was applied across the electrodes from a Murex D.C. Welding Generator.

During etching, the anode was initially immersed in the electrolyte to a depth of 228 mm. for 20 minutes, was then gradually withdrawn a distance of 50 mm. during the next 20 minutes, and was finally immersed to a depth of 305 mm. for a further 30 minutes, to yield a screw having a flight zone 305 mm. in length comprising a feed zone 178 mm. in length having a flight depth of 1.65 mm. and a compression zone 77 mm. in length having a flight depth of 0.63 mm., the feed and compression zones being separated by a gradually tapered root some 50 mm. in length.

After removal of the paint from the flight tips, the screw was nitrided and polished, and was of suitable quality for use in an extruder.

EXAMPLE 2

This example illustrates the production of a screw having an eccentric root diameter to aid mixing of polymeric materials during extrusion thereof.

A ¾" (19 mm.) diameter "silver" steel rod, containing 1% by weight of carbon, was masked over a length of 11" (280 mm.) with a chlorinated rubber paint applied to the surface of the rod in a spiral pattern of 2" (51 mm.) pitch, the land dimension of the pattern being approximately ⅛" (3.17 mm.).

The masked region of the rod was immersed, as anode, in an electrolytic bath comprising an aqueous solution containing 5% by weight of sodium chloride and 4% by weight of hydrochloric acid, together with an austenitic stainless steel tube cathode of 2" (51 mm.) diameter located parallel to and some 1¼" (32 mm.) from the rod. An auxiliary anode, in the form of a ¾" (19 mm.) diameter silver steel rod, was positioned parallel to and some 2" (51 mm.) away from the masked rod on the opposite side thereof in relation to the cathode.

A current of 80 amperes at 10 volts was applied across the electrodes for 1¼ hours, the current density at the anode being 2 amps/cm.$^2$, and the temperature of the electrolytic bath rising from 25° C. to 60° C.

The resultant screw, after treatment and polishing as in Example 1, had a flight depth of 0.02" (0.51 mm.) on the side directed towards the auxiliary anode, and of 0.035" (0.89 mm.) on the diametrically opposed side, the land dimension or flight width being approximately ³⁄₃₂" (2.4 mm.).

EXAMPLE 3

This example relates to the production of a screw, the root diameter of which is varied along the length of the screw.

A rod anode of the same material and dimensions, and masked over an 11" (280 mm.) length with chlorinated rubber paint was placed in an electrolytic bath of the same composition as that of Example 2. An austenitic stainless steel tube cathode of 2" (51 mm.) diameter was located parallel to and some 3" (76 mm.) from the anode.

The anode was initially immersed in the electrolyte to a depth of 4" (101 mm.), and a current of 80 amperes at 10 volts passed between the electrodes for a period of 0.5 hours, the current density at the anode being 2 amps/cm.$^2$. During this period the increase in temperature of the electrolyte bath, from an initial value of 25° C., caused the level of the electrolyte to rise by about 1½" (38 mm.).

The masked length of the anode was then totally immersed in the electrolyte bath, and the same current passed for a period of 1 hour, the temperature of the electrolyte at the end of that period being 70° C.

The resultant screw, when cleaned and polished, had a flight depth of 0.025" (0.63 mm.) and flight width of ³⁄₃₂" (2.4 mm.) over 6" (152 mm.) of its length, these dimensions gradually changing over a transition zone of length 1½" (38 mm.) to a flight depth of 0.06" (1.5 mm.) and flight width of ¹⁄₁₆" (1.6 mm.), the transition zone being, in effect, that length of the screw subsequently immersed by the increase in depth of the electrolyte bath during the initial etching treatment of 0.5 hours duration.

EXAMPLE 4

This example illustrates the production of a screw having a uniform flight depth over its length.

A 2" (51 mm.) diameter plain carbon steel (BS 970–En3) rod anode was masked over a length of 13" (330 mm.) with "Lacomit," a polymeric masking compound supplied by W Canning and Company, Birmingham, the mask being applied in a spiral pattern of 2½" (63 mm.) pitch, the flight or land width of the pattern being ¼" (6.3 mm.).

A multiple basket cathode consisting of four austenitic stainless steel strips, each of width 1" (25 mm.) distributed vertically parallel to each other, and joined at the base on a 7" (178 mm.) pitch circle diameter was located in an electrolytic bath comprising an aqueous solution of 9% sodium chloride and 4% hydrochloric acid by weight of the solution. The base of the basket cathode was covered by a polyethylene terephthalate disc of 6½" (165 mm.) diameter, to ensure uniform current distribution, and the masked anode placed centrally within the basket.

A current varying between 250 to 280 amperes was passed between the electrodes for a period of 9 hours, the current density at the anode being approximately 0.5 amps/cm.$^2$, and the temperature of the electrolyte increased from 25° C. to 80° C.

The resultant cleaned and polished screw had a uniform flight depth of 0.09" (2.3 mm.), and a flight width of ⅛" (3.2 mm.).

EXAMPLE 5

The procedure of Example 4 was repeated, the width of masking being ½" (12.7 mm.), and the current being passed for a period of 8 hours.

The resultant cleaned and polished screw had a uniform flight depth of 0.18" (4.6 mm.), and a flight width of ¼" (6.3 mm.).

We claim:

1. A method of forming an extruder screw which includes applying to the surface of a metallic rod of substantially circular cross-section a masking resist in a configuration corresponding to that of the land pattern of the screw, subjecting the masked rod, as anode, to the action of an electrolytic solution traversed by an electric current to remove metal from the unmasked areas of the rod, and removing the masking resist from the resultant screw.

2. A method according to Claim 1 in which the electrolytic solution is an aqueous solution containing from 1 to 10% of sodium chloride by weight of the solution.

3. A method according to Claim 1 in which the electrolytic solution contains from 2% to 4%, of hydrochloric acid by weight of the solution.

4. A method according to Claim 1 in which a current of from 10 to 30,000 amperes at a voltage of from 5 to 20 volts is employed and a current density of 0.5 to 5 amperes per square centimeter is maintained at the anode.

5. A method according to Claim 1 in which a direct current such as will maintain a current density of from 0.5 to 5 amperes per square centimetre at the anode is employed.

6. A method according to Claim 1 in which the root diameter at zones along the length of the screw is controlled by varying the time for which the respective zones are subjected to the action of the electric current in the electrolytic solution.

7. A method according to Claim 1 in which the root diameter of the screw is controlled by varying the current density at zones along the length of the anode.

8. A method of forming an extruder screw comprising: applying to the surface of a metallic rod of substantially circular cross-section a masking resist in a spiral configuration corresponding to the desired configuration of the land pattern of the screw; immersing said surface of the rod in an electrolytic solution as an anode; immersing in the solution a cathode parallel to the rod; traversing an electrical current between the rod and the cathode to remove metal from the unmasked areas of the rod; and removing the masking resist from the resultant screw.

9. A method as in Claim 8 wherein the masked rod is at least partially withdrawn from the electrolyte in an axial direction during application of the electrical current.

10. A method as in Claim 9 wherein the rod is withdrawn at a substantially constant rate so as to produce a tapered rod diameter along the rod.

References Cited

UNITED STATES PATENTS

| | | | |
|---|---|---|---|
| 3,051,638 | 8/1962 | Clifford et al. | 204—129.65 |
| 2,739,935 | 3/1956 | Kehl et al. | 204—129.65 |
| 3,174,920 | 3/1965 | Post | 204—129.65 |
| 3,139,394 | 6/1964 | Oelgoetz | 204—129.65 |
| 3,616,349 | 10/1971 | Szupillo | 204—129.65 |
| 852,873 | 5/1907 | Davidson | 156—8 |
| 3,013,956 | 12/1961 | Hugle et al. | 204—129.65 |

FOREIGN PATENTS

| | | | |
|---|---|---|---|
| 661,273 | 11/1951 | Great Britain | 204—129.65 |

TA-HSUNG TUNG, Primary Examiner

U.S. Cl. X.R.

204—129.1, 129.75

UNITED STATES PATENT OFFICE
CERTIFICATE OF CORRECTION

Patent No. 3,843,501　　　　　　　　Dated October 22, 1974

Inventor(s) Kenneth Bryan King

It is certified that error appears in the above-identified patent and that said Letters Patent are hereby corrected as shown below:

In the heading:

Please add:

-- Foreign Application Priority Data

July 27, 1971　Great Britain..........35205/71 --

Signed and sealed this 18th day of February 1975.

(SEAL)
Attest:

RUTH C. MASON
Attesting Officer

C. MARSHALL DANN
Commissioner of Patents
and Trademarks